United States Patent Office 2,736,631
Patented Feb. 28, 1956

2,736,631

TREATMENT OF ORGANIC DERIVATIVES OF CELLULOSE TO PREVENT ACID-FADING

William J. Myles, Summit, N. J., assignor to Celanese Corporation of America, New York, N. Y., a corporation of Delaware No Drawing. Application April 4, 1952,
Serial No. 280,671

14 Claims. (Cl. 8—61)

This invention relates to the treatment of organic derivatives of cellulose in order to enhance the fastness of dyes thereon.

An object of this invention is to provide an organic derivative of cellulose which is highly resistant to acid-fading, even when dyed with colors which are not ordinarily fast to acid fumes.

A further object of this invention is the production of dyed cellulose acetate or other organic derivative of cellulose textile materials containing acid fading inhibitors which have an affinity for said cellulose acetate or other organic derivative of cellulose textile materials and which do not discolor on exposure to light and acid fumes.

A further object of this invention is the production of dyed cellulose acetate or other organic derivative of cellulose textile materials containing acid fading inhibitors which are fast to washing and dry cleaning.

Other objects of this invention will appear from the following detail description.

In the coloration of textile materials it is very desirable that the colors produced on the materials be as fast as possible to light, washing and to other agencies such as acid fumes. Many dyestuffs yield on organic derivative of cellulose materials desirable colors which are fast to washing but these colors often suffer from a lack of fastness to acid fumes. When fabrics to which these dyestuffs have been applied are exposed to acid fumes, such as, for example, the products of the combustion of coal, gas, etc., the color undergoes a change in shade. This change is usually referred to as acid fading. The change which occurs may be a dulling of the brightness of the shade in some instances and in others there may be a definite change in color. This undesirable effect is frequently observed in the case of many anthraquinone dyestuffs which yield valuable blue colors on organic derivative of cellulose materials. When fabrics dyed with these colors are exposed to acid fumes the colors change from a pure blue shade to one having a reddish cast. On continued exposure to the acid fumes the blue color may even change to a pink color. Such changes naturally restrict the range of usefulness of these dyestuffs. Accordingly, methods of increasing the resistance of these dyes to acid fading are of great commercial importance.

I have now found that the acid fading characteristics of dyed cellulose acetate or other organic derivatives of cellulose which have been dyed with dyestuffs which are not fast to the action of acid fumes may be substantially improved if there is incorporated in said cellulose acetate or other organic derivative of cellulose a compatible di-(dialkylaminoalkyl) phthalate of the formula:

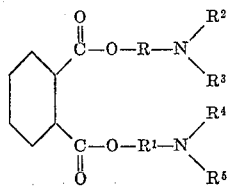

in which R and R$^1$ are alkylene groups, which may be the same or different, such as lower alkylene groups, e. g. ethylene, propylene, butylene; and in which R$^2$, R$^3$, R$^4$ and R$^5$ are alkyl groups, which may be the same or different, such as lower alkyl groups, e. g. methyl, ethyl, propyl, butyl. For example, the inhibitor may be di-(diethylaminoethyl) phthalate or di-(dimethylaminopropyl) phthalate.

The di-(dialkylaminoalkyl) phthalate may be applied to or incorporated into the cellulose acetate or other organic derivative of cellulose in any desired manner. It may be incorporated into a solution of the cellulose derivative before such solution is cast into a film or extruded into a filament. It may be applied to dyed cellulose acetate or other organic derivative of cellulose textile material in the form of a solution in a solvent such as benzene, toluene or other solvent which does not have an undesirable solvent action on the organic derivative of cellulose material. It may also be applied to the dyed organic derivative of cellulose material in the form of a stable aqueous emulsion comprising a solution of said di-(dialkylaminoalkyl) phthalate in a water-insoluble organic solvent, for example, benzene or toluene, which is dispersed in water with the aid of suitable dispersing agents to form the desired emulsion, the droplets of the water-insoluble solvent solution of this inhibiting agent comprising the disperse phase and the water the continuous phase of the emulsion. The proportions of this inhibiting agent preferably range from 0.1 to 5% by weight, based on the weight of the organic derivative of cellulose.

The emulsion or solution of inhibiting agent may be applied to the dyed organic derivative of cellulose textile in any convenient manner. It is preferably applied by padding operations, the nip of the padding mangle being so adjusted that sufficient liquid is retained on the fabric to deposit in uniform fashion thereon from 0.1 to 5% of the inhibiting agent, preferably 1 to 3% based on the weight of the organic derivative of cellulose material. The padded fabric is then dried; as by exposing the fabric to a temperature of 25 to 125° C., preferably about 75° C., until the liquid present is evaporated, usually in from about 1 to 10 minutes. The protection afforded by the inhibiting agent may be increased by allowing the treated fabric to stand in a J-box, for 30 minutes prior to drying. The wash fastness of the treatment may be greatly improved by steaming the treated fabric before or after drying, preferably at a temperature of 100 to 115° C., and preferably at a steam pressure of 1 to 10 lbs./sq. in. gauge. Alternatively, the treated fabric may be dry-heated or heated in the presence of an organic swelling agent for the organic derivative of cellulose material.

When applying the di-(dialkylaminoalkyl) phthalate to the dyed textile material in emulsion form, the phthalate may be dissolved in a solvent therefor, such as toluene, to which has been added a small amount, e. g. about 20% of a swelling agent for cellulose acetate, such as methyl ethyl ketone, and a dispersing agent, such as a water-soluble non-ionic surface active agent.

When applying the di-(dialkylaminoalkyl) phthalate to the dyed textile material in emulsion form, the phthalate may also be dissolved in a water-insoluble organic liquid solvent therefor containing a plurality of dispersing agents, at least one of which is a water-soluble anionic surface-active agent and one of which is a water-insoluble, oil soluble non-ionic surface-active agent. The resulting organic solution is then dispersed in water with agitation to form the desired stable aqueous emulsion, which comprises a dispersion of droplets of the organic solution of the inhibitor in water. The water-insoluble, oil-soluble dispersing agent stabilizes the disperse phase of the emulsion and acts as an auxiliary solvent for the inhibitors in the organic solvent, while the water-soluble anionic surface-active agent stabilizes the emulsion of the water-insoluble droplets in the aqueous continuous phase.

Many proposed inhibitors which are otherwise acceptable have themselves a pronounced tendency to discolor, e. g. to turn yellow, on exposure to acid fumes. The di-(dialkylaminoalkyl) phthalates are non-discoloring. The di-(dialkylaminoalkyl) phthalates have very high inhibiting activity, as shown, for instance, by the results in the examples below. In addition, they can be made to penetrate the organic derivative of cellulose so that the inhibiting effect is fast to washing.

In order to illustrate my invention but without being limited thereto, the following examples are given:

Example I

A cellulose acetate fabric dyed a pastel shade with a blue anthraquinone dye, was padded for 1 minute at a temperature of about 40° C. with an emulsion prepared in the following manner:

One part by weight of di-(diethylaminoethyl) phthalate was dissolved in 5 parts of a mixture consisting of 60% toluene, 20% ethyl methyl ketone and 20% "Emulphor ON." The latter is a monoether of a polyethylene glycol and long chain fatty alcohol obtained by hydrogenation of cocoanut oil fatty acids, marketed by the General Dyestuff Corporation. This solution was added with vigorous stirring to 94 parts of water, to give an emulsion suitable for padding.

This solution was applied to the cellulose acetate textile fabric in a padder at room temperature. The nip of the padding mangle was so adjusted that sufficient liquid was retained on the fabric to deposit uniformly therein 1% of the di-(diethylaminoethyl) phthalate. The treated fabric was then dried. The resulting fabric had greatly improved resistance to acid fading, as shown by no appreciable fading after 2 fading exposures by the tentative test No. 23–46 described in the 1951 year book of the American Association of Textile Chemists and Colorists.

A still further improved resistance to acid fading can be obtained by allowing the treated material to stand in a J-box for 30 minutes after passing through the padding rolls and before drying.

The wash-resistance of the treatment was improved by steaming the treated fabric for 10 minutes at 7 lb./sq. in. steam gauge pressure with saturated steam in a pressure pot.

Example II

Example I was repeated except that the padding emulsion contained 2 parts by weight of di-(diethylaminoethyl) phthalate, 10 parts of a mixture of 60% toluene, 20% ethyl methyl ketone and 20% "Emulphor ON," and 88 parts of water, and the padding mangle adjusted so that 2% of the di-(diethylaminoethyl) phthalate was deposited in the fabric. After the steaming treatment the fabric was subjected to mild washing and still showed no appreciable fading after 4 fading exposures by the A. A. T. C. C. test method No. 23–46.

The dye used in Examples I and II was a mixture of equal parts of 1,4-diethanolamino 5,8 dihydroxy anthraquinone and 1-amino-4-anilino anthraquinone. Similar results were obtained with fabrics dyed with 1,4-dimethylamino anthraquinone.

While my invention has been more particularly described in connection with the treatment of materials having a basis of cellulose acetate, equally satisfactory results are obtained in the treatment of materials having a basis of other organic derivative of cellulose. Examples of other organic derivatives of cellulose are cellulose esters such as cellulose propionate, cellulose butyrate, cellulose acetate-butyrate and cellulose acetate propionate and cellulose ethers such as ethyl cellulose and benzyl cellulose.

It is to be understood that the foregoing detailed description is given merely by way of illustration and that many variations may be made therein without departing from the spirit of my invention.

Having described my invention, what I desire to secure by Letters Patent is:

1. An organic derivative of cellulose selected from the group consisting of cellulose esters and cellulose ethers having incorporated therein a compatible di-(dialkylaminoalkyl) phthalate in which each alkyl is a lower alkyl.

2. An organic derivative of cellulose selected from the group consisting of cellulose esters and cellulose ethers having incorporated therein di-(diethylaminoethyl) phthalate.

3. Cellulose acetate having incorporated therein a di-(dialkylaminoalkyl) phthalate, in which each alkyl is a lower alkyl.

4. Cellulose acetate having incorporated therein di-(diethylaminoethyl) phthalate.

5. Organic derivative of cellulose selected from the group consisting of cellulose esters and cellulose ethers, textile material having incorporated therein 0.1 to 5% of its weight of di-(diethylaminoethyl) phthalate.

6. Cellulose acetate textile material having incorporated therein 0.1 to 5% by weight of di-(diethylaminoethyl) phthalate.

7. Dyed organic derivative of cellulose selected from the group consisting of cellulose esters and cellulose ethers textile material dyed with a dyestuff normally tending to fade, on said material, on exposure to acid fumes and having incorporated therein, as an acid fading inhibitor, a di-(dialkylaminoalkyl) phthalate in which each alkyl is a lower alkyl.

8. Dyed organic derivative of cellulose selected from the group consisting of cellulose esters and cellulose ethers textile material dyed with a dyestuff normally tending to fade, on said material, on exposure to acid fumes and having incorporated therein, as an acid fading inhibitor, di-(diethylaminoethyl) phthalate.

9. Dyed cellulose acetate textile material dyed with a dyestuff normally tending to fade, on said material, on exposure to acid fumes and having incorporated therein, as an acid fading inhibitor, di-(diethylaminoethyl) phthalate.

10. Dyed cellulose acetate textile material dyed with a dyestuff normally tending to fade, on said material, on exposure to acid fumes and having incorporated therein 0.1 to 5% by weight, based on the cellulose acetate, of di-(diethylaminoethyl) phthalate.

11. Process of improving the fastness to acid fading of colorations on dyed organic derivative of cellulose selected from the group consisting of cellulose esters and cellulose ethers textile material, which comprises treating said dyed organic derivative of cellulose textile material with a di-(dialkylaminoalkyl) phthalate in which each alkyl is a lower alkyl.

12. Process of improving the fastness to acid fading of colorations on dyed cellulose acetate textile material, which comprises treating said dyed cellulose acetate textile material with a di-(dialkylaminoalkyl) phthalate in which each alkyl is a lower alkyl.

13. Process of improving the fastness to acid fading of colorations on dyed cellulose acetate textile material, which comprises treating said dyed cellulose acetate textile material with an aqueous emulsion comprising, dispersed in water, a solution of di-(diethylaminoethyl) phthalate in an organic solvent, and then subjecting the treated fabric to steam under pressure to improve the wash resistance of the treated textile material.

14. Process of improving the fastness to acid fading of colorations on dyed organic derivative of cellulose selected from the group consisting of cellulose esters and cellulose ethers textile material which has been dyed with an anthraquinone dye, which comprises treating said dyed organic derivative of cellulose textile material with a di-(dialkylaminoalkyl) phthalate in which each alkyl is a lower alkyl and then steaming said treated dyed textile material.

References Cited in the file of this patent

UNITED STATES PATENTS

| | | |
|---|---|---|
| 1,914,945 | Ellis | June 20, 1933 |
| 2,083,122 | Olpin | June 8, 1937 |
| 2,094,809 | Olpin | Oct. 5, 1937 |
| 2,539,212 | Strobel | Jan. 23, 1951 |

FOREIGN PATENTS

| | | |
|---|---|---|
| 613,818 | Great Britain | Dec. 3, 1948 |

OTHER REFERENCES

American Dyestuff Reporter for May 12, 1952, pages P297 to P302.